United States Patent [19]

Geiser

[11] Patent Number: 5,379,983

[45] Date of Patent: Jan. 10, 1995

[54] SHUT-OFF VALVES FOR PIPELINES

[75] Inventor: Friedrich Geiser, Nüziders, Austria

[73] Assignee: VAT Holding AG, Haag, Switzerland

[21] Appl. No.: 171,598

[22] Filed: Dec. 21, 1993

[51] Int. Cl.⁶ ................................................ F16K 3/00
[52] U.S. Cl. ...................................... 251/167; 251/197
[58] Field of Search ......................... 251/167, 196, 197

[56] References Cited

U.S. PATENT DOCUMENTS

| | | | |
|---|---|---|---|
| 2,204,142 | 6/1940 | MacClatchie | 251/196 X |
| 4,052,036 | 10/1977 | Schertler . | |
| 4,290,580 | 9/1981 | Balhouse | 251/197 X |
| 4,470,576 | 9/1984 | Schertler . | |
| 4,651,973 | 3/1987 | Oliver | 251/329 X |

Primary Examiner—John C. Fox
Attorney, Agent, or Firm—Anderson Kill Olick & Oshinsky

[57] ABSTRACT

A shut-off slide valve for use in pipelines or for closing a container aperture includes a housing, a shut-off member formed of a sealing plate and a counter element spaced from the sealing plate and displaceable in the housing, and an actuation member for displacing the shut-off member in the housing, with the actuation member having a portion extending between the sealing plate and the counter element, and at least one of the sealing plate and the counter element having a collar substantially bridging the space between the sealing plate and the counter element, so that the shut-off member has a shape similar to that of a lid-covered can.

6 Claims, 2 Drawing Sheets

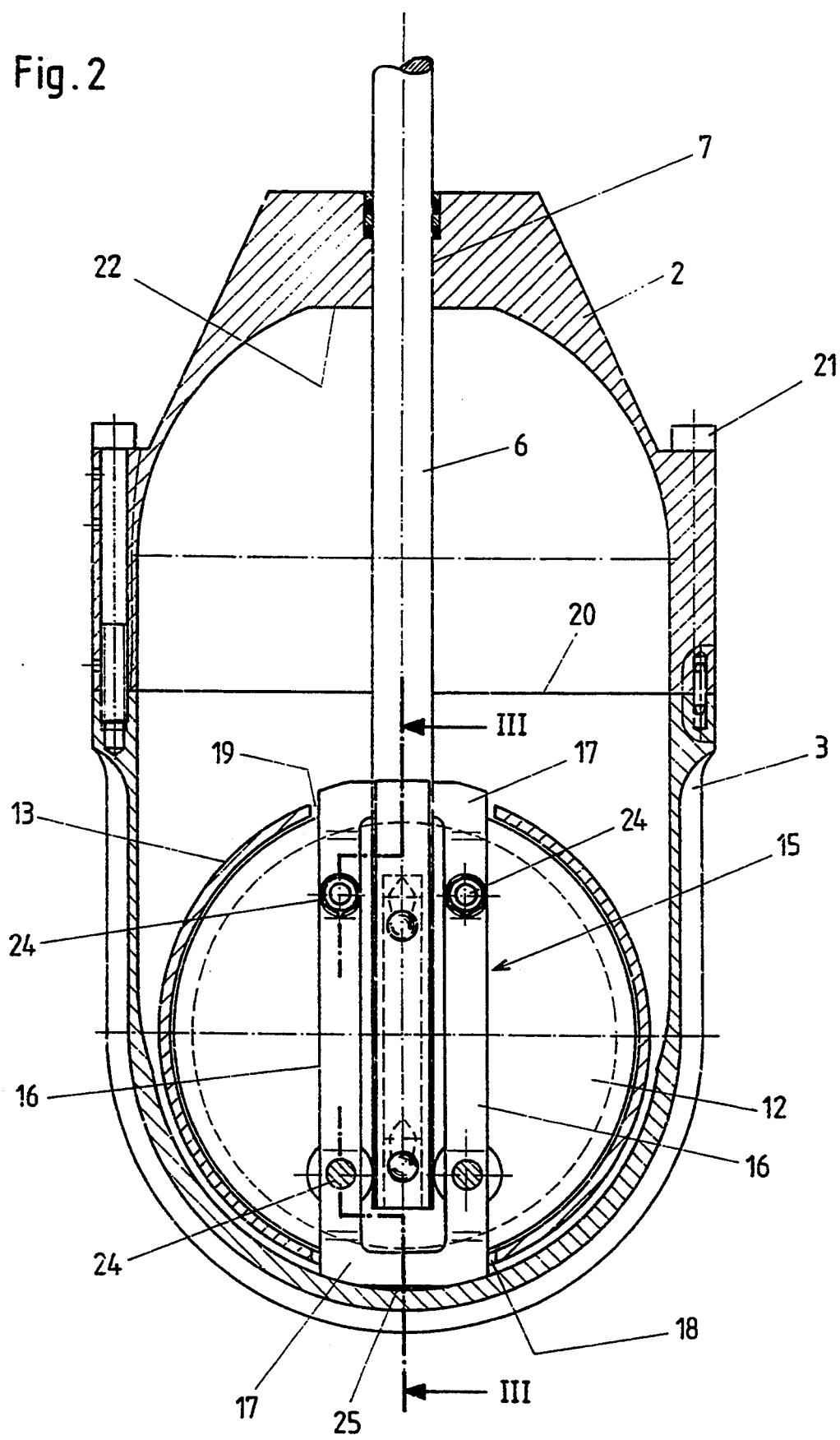

SHUT-OFF VALVES FOR PIPELINES

FIELD OF THE INVENTION

The present invention relates to a shut-off slide valve for pipelines or container apertures, especially in vacuum installations, and including a housing and a multipart shut-off member displaceable therein by an actuation member, with the shut-off member including at least one sealing plate and a counter element.

BACKGROUND OF THE INVENTION

A slide valve of this type is, for instance, disclosed in U.S. Pat. No. 3,368,792. Slide valves of this type have proved effective when used in installations containing a pure residual gas atmosphere. However, when a slide valve of this type is used in a vacuum installation which contains a contaminated residual gas atmosphere (condensed vapors, dust particles and the like), contamination of the mechanism which serves for interacting displacement of the sealing plate and counter element and, thereby, its function, cannot be prevented.

To prevent contamination, slide valves of this type were designed in such a manner that the shut-off member is sealed on all sides (U.S. Pat. No. 4,052,036). In this case, metal bellows were provided between the sealing plate and the counter element, forming the shut-off member. This indeed seals off the displacement or adjustment mechanism against the atmosphere surrounding the slide valve on the inside. The disadvantage of this design however lies in that these bellows require relatively large space for housing them and installing them, so that, when viewed in the flow direction of the slide valve, the shut-off member becomes very wide. This is considerably disadvantageous in many applications.

Accordingly, the main object of the invention is to keep the width of the shut-off member as small as possible, so that the slide valve is narrow.

SUMMARY OF THE INVENTION

This and other objects of the present invention, which become apparent hereinafter, are achieved by providing at least one of the sealing plate and the counter element with a collar at its external edge, with the collar being oriented against the actuation member, which is located between the sealing plate and the counter element, so that the shut-off member has a shape similar to that of a lid-covered can.

BRIEF DESCRIPTION OF THE DRAWING

The objects and features of the present invention will become more apparent, and the invention itself will be best understood from the following detailed description of the preferred embodiments accompanying the drawings, wherein:

FIG. 2 is a longitudinal cross-sectional view of the slide valve in the closed position thereof;

DETAILED DESCRIPTION OF THE PREFERRED EMBODIMENT

Figure 1:
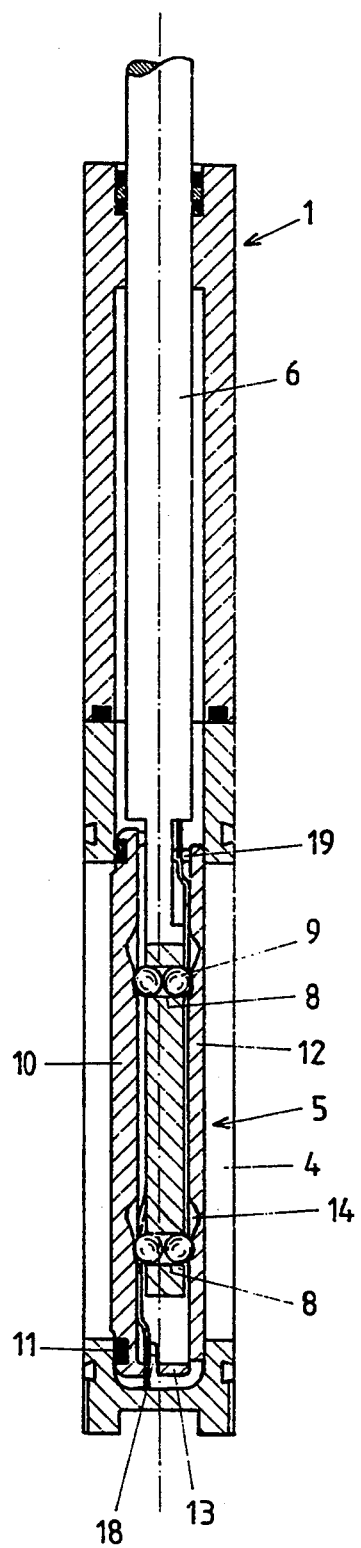
FIG. 1 is a transverse cross-sectional view of the slide valve according to the present invention in a closed position thereof.
Figure 4:
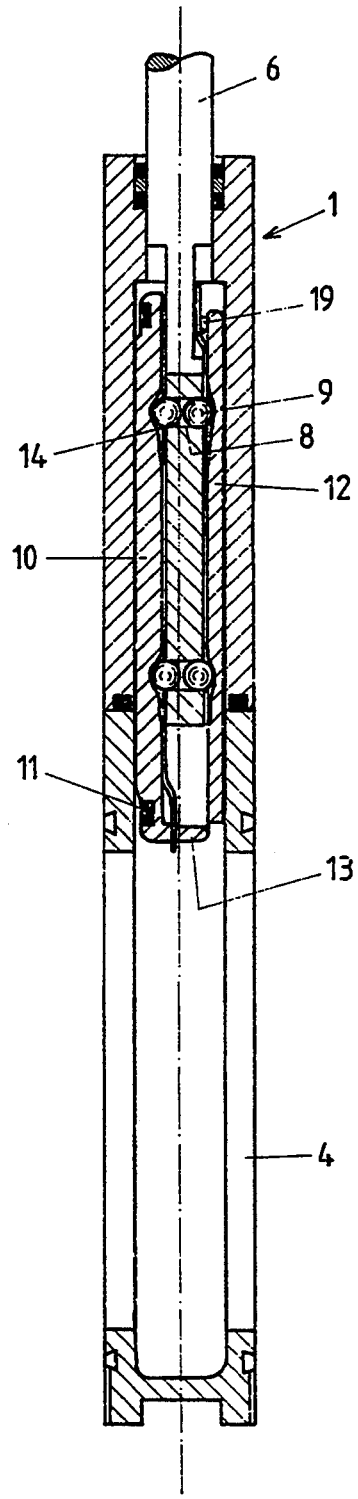
FIG. 4 is a cross-sectional view of the slide valve similar to that of FIG. 1 in the open position of the slide valve.
Figure 3:
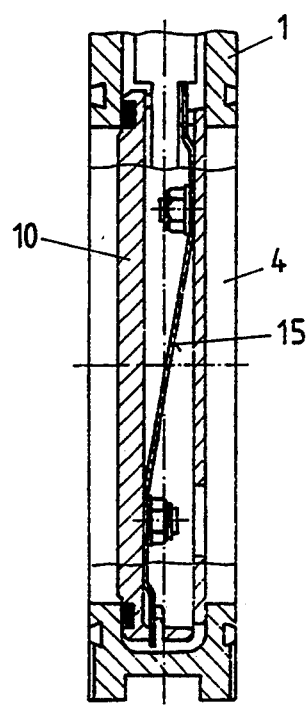
FIG. 3 is a cross-sectional view along line III—III in FIG. 2.

A slide valve shown in the Figures includes a shut-off member 5 which is supported for displacement in its plane in a slide valve housing 1 consisting of two housing parts 2 and and having a through aperture 4. The shut-off member 5 is displaceable by a rod-shaped actuation member 6 which extends through the bore 7 in the housing 1. A mechanical, pneumatic, hydraulic or manually actuatable displacement mechanism, not shown here, engages at the outer end of the rod-shaped actuation member 6.

The end of the actuation member 6 located inside the housing 1, which member has a circular cross-section along a large portion of its length, is engaged in the shut-off member 5. The portion of the actuation member 6 inside of the shut-off member 5 is flattened. Two bores 8 are disposed in the flattened segment of the actuation member 6 so as to be superimposed and spaced from one another, with a pair of balls 9, which form a spread-apart element, being disposed in each of these two bores 8. The diameter of the ball of this pair of balls 9 is selected in such a way, that the two balls protrude somewhat on both sides, beyond the flattened segment of the actuation member 6, if those balls are adjacent to each other.

Figure 5:
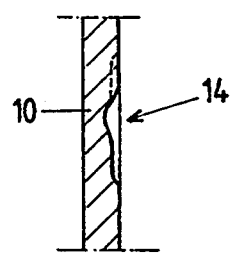
FIG. 5 is an enlarges partial transverse cross-sectional view of the slide valve.

The shut-off member 5 consists of the sealing plate 10 with an annular seal 11 located in a groove formed in the outer surface of the plate 10 adjacent to the edge of the plate 10, and a plate-shaped counter element 12. The sealing plate 10 has a collar 13 facing the actuation member 6, so that this shut-off member 5 is configured similar to a can with a lid. Snap-in surfaces 14 in the form of trough-like cavities are recessed, in positions corresponding to the pairs of balls 9, in the inner surfaces of the sealing plate 10 and counter element 12 facing each other. In the embodiment shown, the snap-in surface 14 comprises a first trough-like depression which transits into a second trough-like depression, with the depths of these depressions being of different magnitude. FIG. 5 shows this trough-like cavity in detail at an enlarged scale compared to other figures.

The parts constituting the can-like shut-off member 5, namely the sealing plate 10 with the collar 13 and the counter element 12, are held together by a prestressed leaf spring 15, which in this case is configured as an elongated rectangle with two parallel long legs 16 and two short legs 17. The length of this frame-like leaf spring 15 is somewhat larger than the diameter of the can-like shut-off member 5. This frame-shaped leaf spring 15 is disposed in such a way that its long legs 16 extend parallel to the displacement direction of the actuation member 6. The actuation member 6 or its segment located within the can-like shut-off member 5 is arranged in between the long legs 16. The respectively lower segments of the parallel long legs 16 of the frame shaped leaf spring 15 are connected to the sealing plate 10 and the upper segments of these legs are connected to the counter element 12. This arrangement can also be reversed. Slot-like recesses 18 and 19 are provided in diametrically opposite portions of the collar 13 of the sealing plate 10, through which the short legs 17 of the frame-like leaf spring 15 protrude somewhat beyond the circumferential contour of the can-like shut-off member 5. The housing 1, which consists of two parts 2 and 3, has a separation plane 20 which separate the two housing parts 2 and 3 lies perpendicularly to the axis of the rod-like actuation member 6 and approximately in the central region of the area swept over by the can-like shut-off member 5. The axes of the fastening elements (bolts) 21, by means of which two housing parts 2 and 3 are clamped together, are essentially parallel to the axis of the rod-like actuation member 6.

Due to the design of the snap-in surfaces 14 described above, the can-like shut-off member 5 is locked in the closed position of the slide valve (FIG. 1). Due to the can-like configuration of the shut-off member 5, its inner space is largely protected against the atmosphere inside the slide valve.

Proceeding from the closed position of the slide valve shown in FIG. 1, the slide valve is opened by moving the rod-like actuation member 6 upward. Thereby in a first step the pairs of balls 9 reach the region of the deep trough-like cavity so that now the parts, namely the sealing plate 10 and the counter element 12, forming the can-like shut-off member 5, are somewhat pulled against each other by the force of the preloaded leaf spring 15, wherein their spacing diminishes, and now the shut-off member 5, together with the actuation member 6, is lifted off of its closed position. This travel upward is limited because short upper legs 17 of the leaf spring 15 protruding beyond the circumferential contour of the can-like shut-off member abuts against the upper inside boundary wall 22 of the housing 1. If now the actuation member 6 is moved slightly further upward, with respect to the now immobile or stationary shut-off member 5, the pairs of balls 9 roll upon the snap-in surface 14 and, as a consequence, spread the can-like shut-off member 5 apart, so that the sealing plate 10 and the matching element 12 come to rest at the wall 23 of the housing 1. If the snap-in surfaces 14 are configured as shown in FIG. 5 in detail and, as shown by the broken line, are symmetrical with respect to a central plane extending perpendicularly to the displacement direction of the actuation member 6, then the slide valve can also be locked in the open position. The flush or closely fitting contact of the parts forming the shut-off member 5 with the wall of the slide valve housing is, therefore, very important because otherwise heat can be transferred from outside through the slide valve housing to the internal mechanism. Installations of the type described above operate in higher temperature ranges, so that the danger exists that vapors existing in the installation will condense at parts of this installation if these are not adequately heated. By the measures according to the invention, it is possible to successfully counteract such a disadvantage.

The attachment points 24 of the long legs 16 of the frame-shaped leaf spring 15 at which the legs 16 are fastened or fixed to the parts forming the can-like shut-off member 5, are spaced from the respective external edges of the narrow legs 17 by at least an amount corresponding approximately to one-quarter of the entire length of the frame-shaped leaf spring 15. Thereby the segments of the leaf spring 5, extending outwardly from the attachment points, are elastically deformable to such an extent, that the parts forming the shut-off member 5 can be moved perpendicularly to their plane without having to exert any force worth mentioning and without their edges grazing or contacting the inside surface of the housing. During the closing process, the actuation member 6, together with the parts of the can-like shut-off member 5, is pulled by the preloaded leaf spring 15 and moves downward (FIGS. 1 and 2). The displacement motion of the shut-off member 5 in its plane is stopped when the lower edge of the lower short leg 17 of the frame-shaped leaf spring 15 abuts the bottom boundary wall 25 of the housing. By moving the rod-like actuation member 6 further, the parts forming the shut-off member 5 are urged outwardly by the pairs of balls 9, so that they are offset sidewise and pressed against the sealing seat, without these parts engaging the internal wall of the housing. This sidewise movement is absorbed by the cantilevered segment of the leaf spring 15 which is deformable. The segment of the leaf spring 15, cantilevered outwardly from the attachment point 24, is sufficiently elastic and deformable, so that the mentioned sideway offset of the parts forming the shut-off member 5 can be achieved without having to exert any particular force.

Due to the described and illustrated subdivision of the housing into two parts, it can be opened easily, and the inner parts of this slide valve are thereby easily accessible. Though in the embodiment shown here a frame-like leaf spring 15 has been described, it is also possible to configure the leaf spring in a U-shaped manner or to form it from two separate strips. The circumferentially closed frame shape serves, however, for stabilizing the parts movable against each other. In the embodiment shown, the sealing plate 10 has a collar 13, and the collar element is configured as a plate. Basically it is possible to provide both the sealing plate and the counter element with such a collar and to direct the two collars against one another, whereby the diameters are so selected, that they interengage similar to a can and a lid. Alternatively, it is possible to provide the collar only at the counter element, thus simply reversing around the illustrated and described arrangement. In the embodiment shown, the balls are provided as spread-apart elements. However, it is also possible to provide swivelable rectangular spread-apart members instead of such pairs of balls. The use of pairs of balls as spread-apart elements has however the advantage that the slide valve can be locked without any special force application both in its position and in its open position.

While a particular embodiment of the invention has been shown and described, various modifications thereof will be apparent to those skilled in the art, and it is not intended that the invention be limited to the disclosed embodiment and/or details thereof, and departures may be made therefrom within the spirit and scope of the invention, as defined by the appended claims.

What is claimed is:

1. A shut-off slide valve for use in pipelines or for closing a container aperture, said shut-off slide valve comprising a housing, a shut-off member displaceable in said housing; and an actuation member for displacing said shut-off member in said housing, wherein said shut-off member comprises a sealing plate and a counter element spaced from said sealing plate;

wherein said actuation member has a portion extending between said sealing plate and said counter element;

wherein at least one of said sealing plate and said counter element has a collar substantially bridging the space between said sealing plate and said counter element, so that said shut-off member has a shape similar to that of a lid-covered can;

wherein said shut-off slide valve further comprises spring means for connecting said sealing plate and said counter element with each other and for pulling said sealing plate and said counter element toward each other, and spread-apart means arranged between said sealing plate and said counter element for spreading said sealing plate and said counter element away from each other; and wherein said spring means comprises a leaf spring, said leaf spring having a major portion thereof extending substantially in a displacement direction of said actuation member, and has an end portion protruding beyond an end of said shut-off member remote from said actuation member, said end portion having an end jutting out relative to said end of said shut-off member.

2. A shut-off slide valve for use in pipelines or for closing a container aperture, said shut-off slide valve comprising a housing, a shut-off member displaceable in said housing; and an actuation member for displacing said shut-off member in said housing, wherein said shut-off member comprises a sealing plate and a counter element spaced from said sealing plate;

wherein said actuation member has a portion extending between said sealing plate and said counter element;

wherein at least one of said sealing plate and said counter element has a collar substantially bridging the space between said sealing plate and said counter element, so that said shut-off member has a shape similar to that of a lid-covered can;

wherein said shut-off slide valve further comprises spring means for connecting said sealing plate and said counter element with each other and for pulling said sealing plate and said counter element toward each other, and spread-apart means arranged between said sealing plate and said counter element for spreading said sealing plate and said counter element away from each other; and wherein said spring means comprises a leaf spring, said leaf spring having the form of a peripherally closed rectangular frame having two parallel elongate legs symmetrically arranged relative to said portion of said actuation member.

3. A slide valve as set forth in claim 2, wherein said elongate legs have opposite end portions, one of said opposite end portions being connected to said sealing plate and another of said opposite end portions being connected to said counter element.

4. A slide valve as set forth in claim 3, wherein attachment points of said elongate legs to said sealing plate and said counter element are spaced from respective outer edges of respective short legs by a distance equal approximately to one quarter of an entire length of said leaf spring.

5. A slide valve as set forth in claim 3, wherein said collar has opposite slots through which said short legs extend.

6. A slide valve as set forth in claim 2, wherein said rectangular frame has opposite short legs extending between said elongate legs, projecting beyond ends of said shut-off member and jutting out relative to the same.

* * * * *